Aug. 27, 1968   G. W. DAHLE   3,398,773
LEAD SHARPENER
Filed Aug. 2, 1966
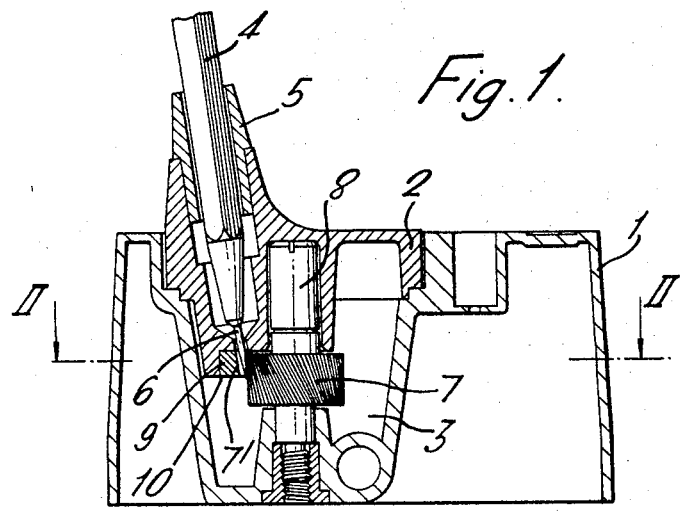
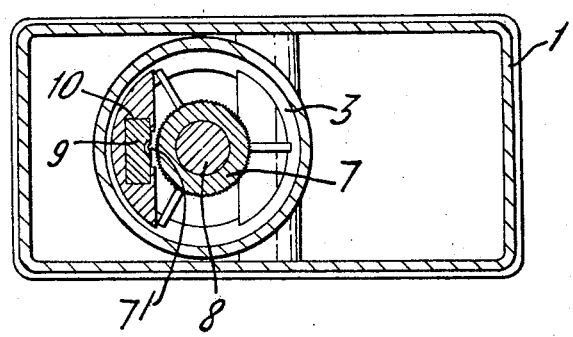
INVENTOR
GERALD WILHELM DAHLE.
BY
ATTORNEY

United States Patent Office 3,398,773
Patented Aug. 27, 1968

3,398,773
LEAD SHARPENER
Gerald Wilhelm Dahle, Marienberg 19,
Coburg, Bavaria, Germany
Filed Aug. 2, 1966, Ser. No. 569,636
Claims priority, application Germany, July 12, 1966,
D 50,533
2 Claims. (Cl. 144—28.1)

The present invention relates to improvements in lead sharpeners of the type as disclosed, for example, in the German Patent No. 1,114,725. This apparatus comprises a cylindrical milling cutter of steel which is non-rotatably mounted on a stationary shaft, a guide for the lead holder which is inclined to and rotatable about the axis of the milling cutter, and a conical lead guiding channel (hereafter called the lead guide or the lead channel) which forms a continuation of the lead holder guide and is cut out at one side adjacent to the milling cutter. The lead guide is integral with the cover of the lead sharpener or, according to a further development of the apparatus, it is covered by a disk which covers the waste container. For manufacturing the apparatus as simply and inexpensively as possible, it is generally made by injection die-casting. For sharpening a lead, the lead holder is inserted into the lead-holder guide and held by hand. Since the lead holder is thereafter moved in a circle around the axis of the milling cutter, the tip of the lead which is located within the conical lead channel and extends at an angle to the cutter axis will while rotating about its own axis be rolled around the cutter and thus milled by the latter. The lead sharpeners of this type have proved to be very successful, as evidenced by the large number which are in use.

It is, however, a well-known fact that devices which are in daily use are not merely judged by their usefulness when new, but also by the length of time for which they will remain fully operative. Although in many cases it is possible to increase the useful life of such devices by exchanging the parts thereof which have become worn or damaged, many purchasers hesitate in buying a device of which they know that sooner at later they will have to replace one or more of its parts, even though these parts might be inexpensive. This problem also restricted the sale of lead sharpeners of the above-mentioned type. The head of this apparatus together with its lead guide and lead-holder guide is generally cast in one piece of a die-casting alloy, while the milling cutter consists of steel. Ordinarily it could be assumed that if there was any part in the apparatus which might be noticeably affected by wear, it could only be the steel cutter the teeth of which are subjected to very high stresses during the milling operation. Entirely unexpectedly it has, however, been found that considerable wear occurs much less on this part than on an entirely different part of the apparatus, namely, on the wall of the conical lead channel. During the milling operation, the tip of the lead carries out a rotary movement about its own axis relative to the wall of the lead channel upon which it must engage since this wall determines the proper position of the tip of the lead relative to the cutter. The relative movement between the tip of the lead and the wall of the lead channel is, however, not a mere sliding movement but it is also affected by a grinding operation by the lead tip itself and also by the fine graphite powder which is produced during the milling operation and penetrates between the lead and the lead guide. This grinding operation is of very little importance in a lead sharpener in an average office or home since the amount of graphite which is milled off in a month is rather small and the wall of the lead channel will thus not be ground off noticeably for a very long time. Different conditions prevail, however, in a drafting office where every day many and long lines are drawn by the draftsmen, so that the leads have to be sharpened very frequently. Consequently, the grinding effect upon the wall of the lead channel will then be so strong that its shape will be affected considerably. The lead and thus also the lead tip will then be guided worse and worse and eventually an accurate lead point will no longer be attained.

It is an object of the present invention to provide a lead sharpener of the general type as above described which overcomes the mentioned disadvantages.

Although for attaining this object it would be possible to make the head part of the lead sharpener integrally with the lead guide and the lead-holder guide of a much more wear-resistant material than a die-casting alloy, such an apparatus would be so expensive that its salability would be very limited. The present invention therefore attains the above-mentioned object in a different manner, namely, by providing the lead channel in an insert which consists of a highly wear-resistant material. The advantages of making these three parts integral with each other are therefore partly abandoned in favor of the greater advantage of increasing the useful life of the apparatus by providing the lead channel in the form of a separate part which is inserted into the end of the lead-holder guide. The durability of the lead guiding channel will in this manner be made at least equal to that of the cutter and the apparatus will thus have a much longer useful life without requiring any parts thereof to be replaced. The insert may be made of any sufficiently wear-resistant material and preferably of a sintered metal.

Although the insert containing the lead channel may be inserted directly into the head of the apparatus by injection molding, it has been found that such a manner of production is not very advisable since it is difficult to center the insert as accurately as required. It is therefore more preferable to fit the insert tightly into a bore of a corresponding size in the lower end of the lead-holder guide and then to secure it therein mechanically.

The features and advantages of the present invention will become further apparent from the following detailed description of one preferred embodiment thereof which is illustrated in the accompanying drawings, in which:

FIG. 1 shows a vertical longitudinal section of a lead sharpener according to the invention, while FIG. 2 shows a section which is taken along the line II—II of FIG. 1.

As illustrated in FIG. 1 of the drawings, the lead sharpener according to the invention is not cup-shaped as the apparatus disclosed in the German patent previously referred to, but in the shape of a small box which consists of a main body 1 and a rotatable plate 2 which also forms a cover for the waste container 3. The guide for the lead holder 4 consists of an insert 5 which is exchangeable for others of different inner diameters so as to permit lead holders of different sizes to be inserted. The axis of the lead-holder guide 5 extends at an angle to the vertical.

For sharpening the lead 6, a cylindrical steel cutter 7 is provided which is nonrotatably secured to or integral with a stationary shaft 8. The tip of the lead is guided within a conical channel 7' the axis of which coincides with the axis of the lead-holder guide 5 and determines the angle of the lead point.

For sharpening a lead, the lead holder is inserted into the guide 5 and held by hand and used as a handle for turning the disk 2 about the axis of the shaft 8. The lead 6 therefore travels with a rolling motion around the cutter 7 and will thus be milled off uniformly on all sides. It will then carry out a rotary movement relative to the lead channel 7' which ordinarily would lead to the wear as previously described. In order to eliminate such wear as much as possible, the invention provides that the lead channel 7' is cut into an insert 9 of a highly wear-resistant material which is tightly fitted into a recess 10 in the head part 2 and mechanically secured thereto, for example, by riveting-over the edges of the recess.

The lead channel 7' will now have at least the same durability as the cutter so that the lead sharpener will not require any spare parts to maintain its usefulness.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A lead sharpener comprising a housing, a cylindrical steel milling cutter nonrotatably mounted in said housing, a lead-holder guide mounted on said housing so as to be rotatable about the axis of said cutter and having an axis inclined to said cutter axis, and an insert of a highly wear-resistant material rigidly secured to said lead-holder guide and having a conical lead-guiding channel which is cut open at one side facing said cutter.

2. A lead sharpener as defined in claim 1, in which the lower end of said lead-holder guide is provided with an aperture into which said insert is tightly fitted and mechanically secured therein.

References Cited

UNITED STATES PATENTS 898,502   9/1908   Peterson _____ 144—28.3

FOREIGN PATENTS 1,114,725   10/1961   Germany.

DONALD R. SCHRAN, *Primary Examiner.*